Patented May 5, 1925.

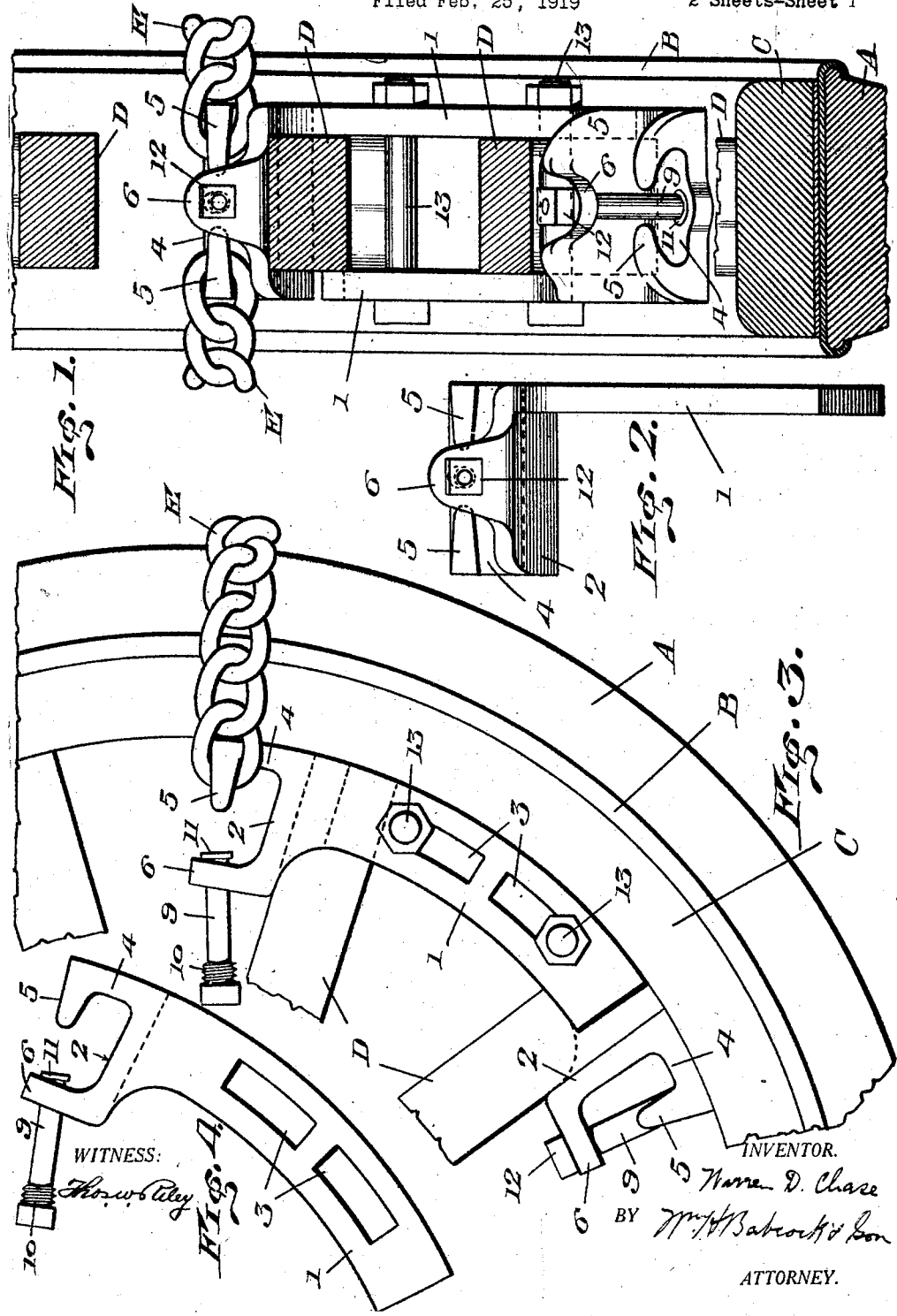

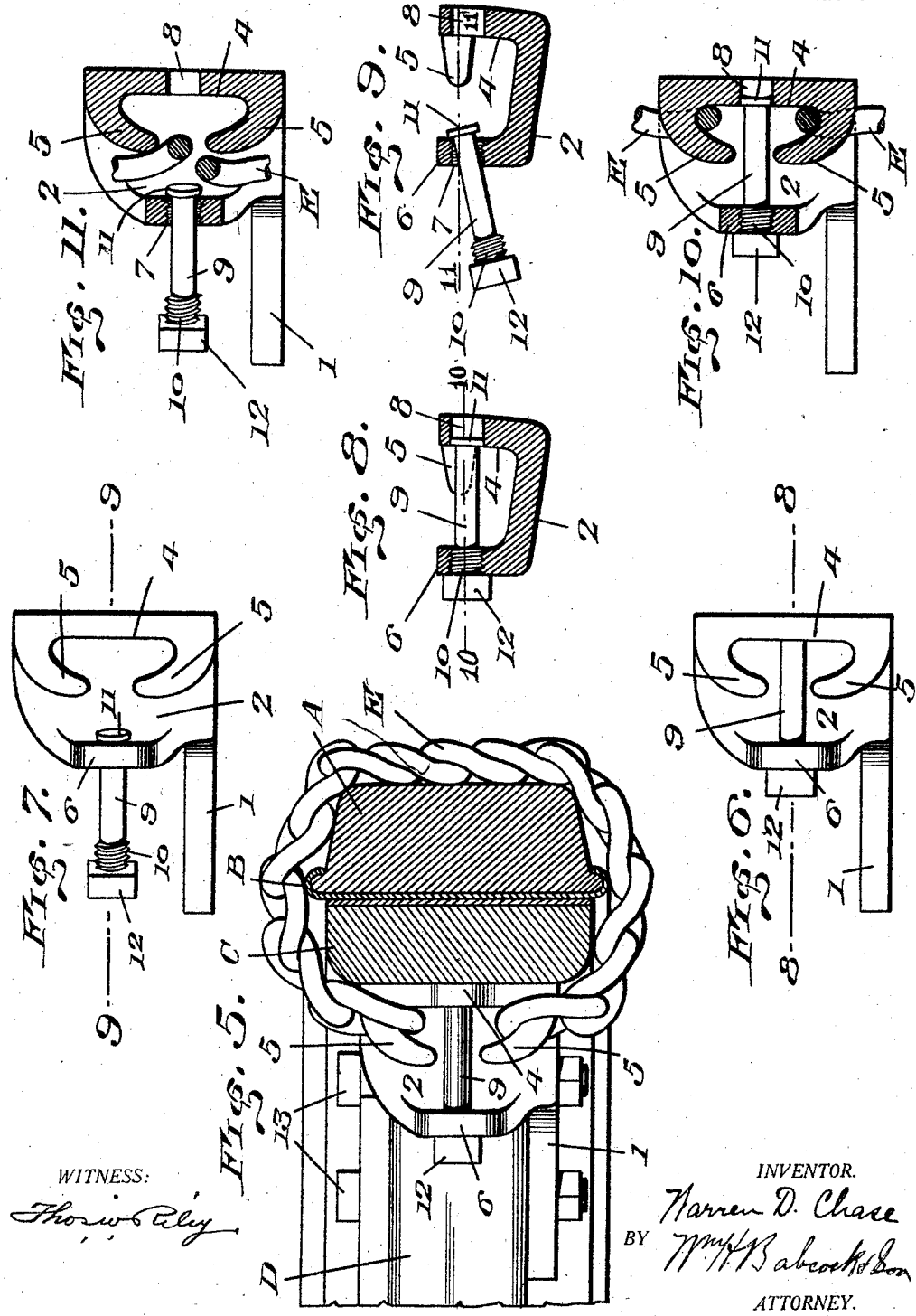

1,536,074

UNITED STATES PATENT OFFICE.

WARREN D. CHASE, OF HARTFORD, CONNECTICUT.

ANTISKIDDING DEVICE.

Application filed February 25, 1919. Serial No. 279,036.

*To all whom it may concern:*

Be it known that I, WARREN D. CHASE, a citizen of the United States, residing at Hartford, in the county of Hartford and State of Connecticut, have invented new and useful Antiskidding Devices, of which the following is a specification.

This invention relates to anti-skidding devices of the fixed point type for use on automobile truck wheels.

The invention has especially in view to provide a device in combination with the wheel whereby two or more traction elements may be attached to one device or clamp, peripherally spaced on the tire of the wheel. The special points in view and the objects sought, and accomplished, are to provide such device which will be universal in application, which will be entirely between the planes passing through the edges of the sides of the rim or some other peripherally extending part of, or carried by, the wheel radially outside of the anchoring devices, in order to protect the device against injury by striking the curb or obstruction in the roadway, sides of ruts and the like; and to mount the securement or anchoring means per se in such manner that it will be located between two adjacent spokes of the wheel, will extend transversely of the wheel so as to receive the pull of the respective traction elements from opposite sides of the wheel so that the strain of the chain will be borne directly by the material of the connecting or securing or anchoring means per se, guarding the clamp device as a whole against being subjected to injurious strains or sudden pulls and stresses tending to loosen the securing bolts or snap the plates of the clamp; and to have no part of the anchoring or securing means per se extending beyond the planes coincident with the lateral faces of the spokes of the wheel, so that these anchoring means per se will be located well inward from the sides of the wheel and protected by the felly, etc., from injury by curbing, sides of ruts and the like; and also to so mount the device that it will extend peripherally of the wheel, will be clamped against the lateral sides of the spokes; to so construct, mount and arrange the clamp or device that in its operative position it will distribute the strain of the pull of the traction elements equally between the spokes and the felly; to so form the device that each clamp member will engage the lateral faces of two adjacent spokes and the face of one of said spokes at right angles thereto, in order that these clamps may get a good purchase on the spokes and so that any bucking tendency radially of the wheel, will be entirely offset; and to so construct, mount and arrange the clamps or device as a unit so that in its operative position on the wheel it will distribute the strain of the pull or jerk of the traction elements equally between the spokes and the felly; and to so form the plates making up the device that but one master pattern or die will be necessary, the plates making up the clamp being identical in form, size and strength.

In the accompanying drawings, in which only the preferred form clamp is shown by way of illustration, Figure 1 represents a view partly in section, of a segment of a truck wheel, looking from the hub toward the rim, with a device applied to the spokes thereof in accordance with my invention;

Figure 2 represents a detail perspective view of one of the clamp plates or members;

Figure 3 represents a side elevation of a portion of a wheel with one of the devices applied thereto with the chains passing around the felly and tire;

Figure 4, a side elevation of one of the plates of the clamp;

Figure 5, a sectional view through the felly and tire of the wheel, with a chain applied and the spokes broken away;

Figure 6, an end view of one of the members of the clamp, with the keeper or guard or emergency pin in normal position;

Figure 7, a similar view with the keeper open;

Figure 8, a sectional view on the line 8—8 of Figure 6;

Figure 9, a sectional view on the line 9—9 of Figure 7, the keeper being shown in side elevation;

Figure 10, a sectional view on the line 10—10 of Figure 8 with the terminal links of the chains applied to the hooks, the keeper being shown in elevation; and Figure 11, a sectional view on the line 11—11 of Figure 9, with the terminal links of the traction chains in different intermediate positions of applications, the keeper being shown in elevation.

Referring now in detail to the drawings: A represents the tire, B the rim, C the felly and D the spokes of the wheel, and E represents the cross chains or other type of anti-skidding or traction elements passing transversely around the tire A.

The clamp or device is composed of two plates, each plate having a long arm 1, provided with two or more longitudinal slots 3, and a short arm 2 having a flange 4 from which two hooks 5 project toward each other and have their tips in adjacency to delimit a single opening or passage for the insertion, or withdrawal, therethrough of the respective terminal portions of a traction element for the application to, or removal from, the respective hooks of said terminal portions.

This arm 2 is also provided with a lug 6 having an internally screw-threaded perforation 7, and which is substantially parallel to, and extends in the same direction as, the flange 4, which flange has a hole 8 larger than the perforation 7, and preferably having the same axis.

A pin or keeper 9 having a screw-threaded portion 10 and an enlarged head 11 is to be inserted, screw-threaded end first, through hole 8 and screwed through perforation 7 until the threads of portion 10 are free from the threads in the wall of said perforation, when said pin is free to be slipped through lug 6 until the head 11 strikes the adjacent portion of the lug 6, when an angular head 12 is to be applied to the threaded portion 10, the extreme end thereof being then upset. This head 12, will preferably have a tapered thread so that it will be locked in position and can have no movement on the pin 9 after the end of the latter is upset.

This pin 9 as shown in the drawings is so arranged that it will be in such a position with relation to the tips of the two hooks 5 that a terminal link or portion of a traction chain cannot be passed between the respective tips of the hooks 5 and said pin 9 so long as said pin remains in normal position.

In arranged position on the wheel the lug 6 will be radially nearer the hub than the flange 5, the outer face of the latter, will extend substantially parallel to and will be against the inner peripheral face of the felly, and the pin 9 will by reason of the centrifugal force and jarring action caused by the travel of the wheel over the road surface, be automatically turned up tight and held tight in normal position, as has been ascertained by actual test.

The slots 3, are of such size and so located in the arms 1 that they extend longitudinally of the arms 1 and in arranged position on the smallest size standard truck wheel the slots of the two arms register so that two ordinary bolts 13 may be passed through the pairs of slots 3 and drawn tight to pull the arms 1 up tight against the lateral faces of the spokes, the two plates being in reversed relation so that the arm 2 of one plate engages the transverse face of the spoke engaged by the other end of the arm 1 of the other plate, said transverse face of the first mentioned spoke being on the other side of the spoke from the bolts 13.

In applying to the next larger size of wheel the clamp will be longitudinally extended so that the slots 3 will overlap in order that bolts 13 may be passed therethrough between the spokes and drawn tight as above described.

In the largest size of wheel the clamp is still further longitudinally extended so that the overlapping of the slots 3 is a little less, but leaves sufficient room for the insertion of the bolts 13.

The dimensions of the spokes differ to the greatest extent transversely of the wheel and this is easily compensated for by using bolts 13 of different lengths to correspond with the transverse dimension of the spoke.

This provides for universal application to all standard truck wheels of different sizes as to diameter of wheel, or cross sectional dimensions of the spokes.

The arms 1 and 2 of each plate will have their outer edges, in their applied relation formed on a continuous arc corresponding to the curve of the inner peripheral face of the felly of the smallest size of wheel so as to engage against the same at all points, but the difference of the arc between the smallest and largest wheel will not be great and will not be an objectionable feature when the clamps are applied to the largest wheel.

It is not necessary that the bolts 13 should engage the transverse faces of the adjacent spokes; it is possible that they may, but it is preferable that they should not as the closer they are to the spokes the harder of access they are, and for this reason the slots 3 have been especially provided, allowing the bolts to be positioned with relation to the spokes at the points where they will be most accessible.

It is not necessary that the slots 3 exactly register when the clamp is applied to the smallest wheel, they may register or overlap in either direction, but it is necessary that the slots 3 should register or sufficiently overlap, as applied to the extreme sizes of wheels, so that bolts 13 may be inserted through the respective pairs of slots 3.

The pin 9 is preferred as a guard or closure means because it may be used as an emergency securing means, but any other suitable closure may be used that will provide this emergency feature, or so far as the general arrangement is concerned this closure may be entirely dispensed with, or some other closure that will close the opening or passage between the tips of the hooks 5 may be used.

Having thus described my invention, what I claim as new and desire to secure by Letters Patent is:

A device to secure a traction element to a wheel comprising plates adapted to be applied to the spokes thereof and means for securing such plates in such position, one of said plates being provided with an arm engaging one of said spokes on its transverse face farthest from said securing means, said arm having anchoring means for the terminal portions of the traction element, said anchoring means receiving pull from the traction element in substantially opposite directions transversely of the wheel, the device having no part extending beyond planes passing through the side edges of an outer peripheral part of the wheel.

WARREN D. CHASE.